(12) United States Patent
    Kwak et al.

(10) Patent No.: US 12,617,683 B2
(45) Date of Patent: May 5, 2026

(54) METHOD FOR PRODUCING TRIFLUOROAMINE OXIDE

(71) Applicants: SK SPECIALTY CO., LTD, Yeongju-si (KR); KOREA RESEARCH INSTITUTE OF CHEMICAL TECHNOLOGY, Daejeon (KR)

(72) Inventors: Junghun Kwak, Yeongju-si (KR); Byunghyang Kwon, Yeongju-si (KR); Yongjun Cho, Yeongju-si (KR); Injoon Park, Daejeon (KR); Shinhong Yuk, Daejeon (KR); Bongjun Chang, Daejeon (KR); Hongsuk Kang, Daejeon (KR); Eunho Sohn, Daejeon (KR); Sanggoo Lee, Daejeon (KR); Jihoon Baik, Daejeon (KR); Juhyeon Kim, Daejeon (KR); Myoungsook Lee, Daejeon (KR); Wonwook So, Daejeon (KR)

(73) Assignees: SK SPECIALTY CO., LTD, Yeongju-si (KR); KOREA RESEARCH INSTITUTE OF CHEMICAL TECHNOLOGY, Daejeon (KR)

( * ) Notice: Subject to any disclaimer, the term of this patent is extended or adjusted under 35 U.S.C. 154(b) by 525 days.

(21) Appl. No.: 18/028,654

(22) PCT Filed: Sep. 23, 2021

(86) PCT No.: PCT/KR2021/012937
    § 371 (c)(1),
    (2) Date: Mar. 27, 2023

(87) PCT Pub. No.: WO2022/080693
    PCT Pub. Date: Apr. 21, 2022

(65) Prior Publication Data
    US 2023/0331552 A1    Oct. 19, 2023

(30) Foreign Application Priority Data
    Oct. 14, 2020    (KR) ........................ 10-2020-0132911

(51) Int. Cl.
    *C01B 21/084* (2006.01)
    *C01G 30/00* (2006.01)

(52) U.S. Cl.
    CPC ........ *C01B 21/0842* (2013.01); *C01G 30/007* (2013.01)

(58) Field of Classification Search
    CPC ....... C01B 21/0842; B01J 27/12; B01J 27/32; B01J 38/02; C01G 30/007
    See application file for complete search history.

(56) References Cited

U.S. PATENT DOCUMENTS 10,934,167 B2 * 3/2021 Kang .................. C01B 21/0842
    2003/0143846 A1 7/2003 Sekiya et al.
            (Continued)

FOREIGN PATENT DOCUMENTS

JP          2004-511088 A    4/2004
    JP          4320389 B2       8/2009
    2005/0155625       A1    7/2005 Tongjian et al.
    2005/0252451       A1   11/2005 Roppu et al.

OTHER PUBLICATIONS

'Catalyst' in IUPAC Compendium of Chemical Terminology, 5th ed. International Union of Pure and Applied Chemistry; 2025. Online version 5.0.0, 2025. https://doi.org/10.1351/goldbook. C00876 (Year: 2025).*

(Continued)

*Primary Examiner* — Paul A Wartalowicz
*Assistant Examiner* — Nicholas A. Piro
(74) *Attorney, Agent, or Firm* — Paratus Law Group, PLLC

(57) ABSTRACT

There is provided a method for producing trifluoroamine oxide. The method includes a step of preparing an interme-
(Continued)

Start

Prepare an intermediate product by simultaneously providing and reacting nitrogen trifluoride and nitrous oxide under the presence of a SbF₅ reaction activator — S10

Produce trifluoroamine oxide by reacting the intermediate product with potassium fluoride under atmospheric pressure and room temperature — S20

End diate product by simultaneously providing and reacting nitrogen trifluoride and nitrous oxide under the presence of a SbF$_5$ reaction activator; and a step of producing trifluoroamine oxide by reacting the intermediate product with potassium fluoride. The step of reacting the intermediate product with potassium fluoride is performed under atmospheric pressure and room temperature.

1 Claim, 1 Drawing Sheet

(56) References Cited

FOREIGN PATENT DOCUMENTS

| KR | 10-2010460 | B1 | 8/2019 |
| KR | 10-2010466 | B1 | 8/2019 |

OTHER PUBLICATIONS

Karl O. Christie. "Oxidative Chemical Oxygenation of NF3 and Novel Synthesis of NF30." J. Am. Chem. Soc. 1995, 117, 6136-6137. (Year: 1995).*

G. Sandford. "Product Cass 1: Fluoroarenes" in Science of Synthesis: Houben-Weyl Methods of Molecular Transformations vol. 31a, Ramsden, C. A., ed. Stuttgart: Georg Thiem Verlag KG (2007). DOI: 10.1055/sos-SD-031-00002 (Year: 2007).*

A. I. Popov et al. "Synthesis and Properties of Pentavalent Antimonyand Bismuth Fluoride," Z. anorg. allg. Chem. 676 (1989) 242-2854. (Year: 1989).*

International Search Report for PCT/KR2021/012937 mailed Jan. 13, 2022 from Korean Intellectual Property Office.

Karl O. Christe, "Oxidative Chemical Oxygenation of NF$_3$ and Novel Synthesis of NF$_3$O", Journal of the American Chemical Society, 1995, pp. 6136-6137, vol. 117, No. 22.

* cited by examiner

Start
Prepare an intermediate product by simultaneously providing and reacting nitrogen trifluoride and nitrous oxide under the presence of a SbF₅ reaction activator  S10
Produce trifluoroamine oxide by reacting the intermediate product with potassium fluoride under atmospheric pressure and room temperature 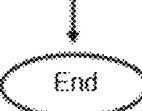 S20
End

METHOD FOR PRODUCING TRIFLUOROAMINE OXIDE

CROSS-REFERENCE TO PRIOR APPLICATIONS

This application is a National Stage Patent Application of PCT International Patent Application No. PCT/KR2021/012937 (filed on Sep. 23, 2021) under 35 U.S.C. § 371, which claims priority to Korean Patent Application No. 10-2020-0132911 (filed on Oct. 14, 2020), which are all hereby incorporated by reference in their entirety.

BACKGROUND

The present invention relates to a method for producing trifluoroamine oxide ($F_3NO$).

Chemical vapor deposition (CVD) process technology is widely known as a thin film forming process for manufacturing a semiconductor device. When the thin film of the semiconductor device is formed in the CVD chamber, it is preferable that the thin film is formed only on the target portion in the CVD chamber, but the thin film forming material is undesirably deposited on other exposed surfaces in the CVD chamber. For example, the thin film forming material may also be deposited on a wall surface, a product fixing jig, a pipe, or the like in the chamber. In addition, material deposited in addition to the target portion during the CVD process can be peeled off to contaminate the surface of the thin film deposited on the target portion or the surface of the target portion on which the thin film is to be deposited. Such contamination causes defects in the semiconductor device, resulting in a reduction in yield. Therefore, a cleaning process is periodically performed to remove unnecessary deposits deposited in the chamber. The cleaning process in the CVD chamber may be performed manually or by using a cleaning gas.

Several basic physical properties are required for the cleaning gas of the CVD chamber. First, the cleaning gas must be able to clean the inside of the CVD chamber within a short time, and should not generate harmful substances. In addition, the cleaning gas should be eco-friendly. A perfluorinated compound, such as $CF_4$, $C_2F_6$, $SF_6$, and $NF_3$, has been used as a chamber cleaning gas or as an etching gas for a deposited thin film in a semiconductor or electronic device manufacturing process. Particularly, the nitrogen trifluoride ($NF_3$) gas is widely used as the cleaning gas in the world.

However, these perfluorinated materials reside in the atmosphere for a very long period of time due to their stability. In addition, since a waste gas after using contains perfluorinated materials which are not decomposed, in a very high concentration, the waste gas should be treated before being released into the atmosphere so that the perfluorinated materials are less than or equal to an acceptable level, and thus a lot of costs are required. Furthermore, these conventional perfluorinated materials are known to have very high global warming potential (GWP) values (100 years with reference to CO2, $CF_4$ 9,200, $SF_6$ 23,900, $NF_3$ 17,200). Thus, these gases give a significant load to the environment. Therefore, demands for an etching or cleaning gas having a low GWP value are very high. In addition, even if the cleaning or etching gas itself is eco-friendly, decomposition into harmful $CF_4$, $NF_3$ and the like may occur during the cleaning or etching process, and thus, when they are discharged, they may remain in the atmosphere for a long period of time.

In particular, the nitrogen trifluoride ($NF_3$) gas is not only globally used in a large amount, but also has a very high global warming potential. Therefore, it is required to reduce the use of the $NF_3$ gas and to develop a replaceable substance to reduce the load on the environment and to make a sustainable development of the semiconductor industry.

Among the alternative candidate gases, trifluoroamine oxide ($F_3NO$) is promising because it is easily decomposed in an aqueous solution to have an extremely low expected GWP and it can replace, in terms of performance. $NF_3$ which is currently used as the cleaning gas. $F_3NO$ is very high in F content that decides the etching and cleaning performance, and is easily decomposed in an acid and an alkali aqueous solution and thus is estimated to have the expected global warming potential close to zero unlike indecomposable PFC. HFC, $NF_3$, and $SF_6$, and it is anticipated that the energy and environmental load in a decomposition treatment of the unreacted residual F3NO would be small. It is also non-toxic when it is leaked, and exhibits physical properties similar to $NF_3$ at room temperature, and thus is highly promising as an alternative gas.

Little is known for a method for producing trifluoroamine oxide ($F_3NO$), which is an alternative gas material.

Patent Literature 1 (US Patent Application Publication No. 2003/0143846 A1) discloses a gas composition containing $F_3NO$ for etching a film of a silicon-containing compound and for cleaning the inside of a reactor, and discloses a method for synthesizing $F_3NO$ wherein a $NF_2OSb_2F_{11}$ salt is synthesized by reacting $NF_3$ and $N_2O$ at a temperature of 150° C. under a $SbF_5$ activator and then the salt is pyrolyzed at a high temperature (>200° C.) to obtain $F_3NO$. However, the yield is extremely low at about 20% with respect to the raw materials $NF_3$ and $N_2O$, and the purity thereof is not even mentioned. In addition, the yield is about 33% with respect to other raw material $SbF_5$. The synthesis method, risks, the yield, the purity of the gas and the like are not sufficiently elucidated as described above in synthesizing $F_3NO$ using the $SbF_5/NF_3/N_2O$ reaction system, and thus it is not clear whether the method is commercially available.

The applicant of the present application has proposed a novel method capable of preparing trifluoroamine oxide with high yield and purity in Patent Literature 2 (Korean Patent No. 10-2010460 B1) and Patent Literature 3 (Korean Patent No. 10-2010466 B1) while using the same $SbF_5/NF_3/N_2O$ reaction system as in Patent Literature 1. For example, according to the method disclosed in Patent Literature 2, $NF_3$ and $N_2O$ are reacted under the presence of $SbF_5$ to obtain $NF_2OSbF_6$, which is an intermediate product, and the intermediate product is pyrolyzed in a vacuum atmosphere by being brought into contact with NaF to obtain trifluoroamine oxide ($F_3NO$) through a two-step reaction. In addition, according to the method disclosed in Patent Literature 3, $NF_3$ and $N_2O$ are reacted under the presence of $SbF_5$ to obtain $NF_2OSbF_6$, an intermediate product, while reactant gases and nitrogen ($N_2$) generated by the reaction are removed, and nitrogen trifluoride and nitrous oxide are additionally provided to prepare the intermediate product, and the intermediate product is reacted with NaF to obtain trifluoroamine oxide ($F_3NO$) through a two-step reaction.

DESCRIPTION OF THE PRIOR ART

Patent Literature (Patent Literature 1) US Patent Application Publication No. 2003/0143846 A1
(Patent Literature 2) Korean Patent No. 10-2010460 B1
(Patent Literature 3) Korean Patent No. 10-2010466 B1

SUMMARY

However, according to the methods for synthesizing trifluoroamine oxide disclosed in Patent Literature 2 and Patent Literature 3, it is necessary to heat the intermediate product at a temperature of about 150° C. to 200° C. in a vacuum atmosphere for the reaction of the second step of reacting the intermediate product with NaF. As a result, an expensive reactor capable of performing a vacuum process is required, and a heating process is required for pyrolysis, thereby increasing the manufacturing cost of trifluoroamine oxide. In addition, since the progress speed of the pyrolysis reaction is slow and a significant amount of time is required to the pyrolysis reaction, productivity is not high.

Accordingly, the objective of the present invention is to provide a method for producing trifluoroamine oxide, in which a manufacturing cost is reduced, and productivity is improved in the process of producing trifluoroamine oxide using the $SbF_5/NF_3/N_2O$ reaction system.

In order to accomplish the objective, the method for producing trifluoroamine oxide according to an embodiment of the present invention comprises the steps of: preparing an intermediate product by simultaneously providing and reacting nitrogen trifluoride and nitrous oxide under the presence of a reaction activator of $SbF_5$; and producing trifluoroamine oxide by reacting the intermediate product with potassium fluoride.

According to an aspect of the embodiment, the reaction of the intermediate product with potassium fluoride may be performed under atmospheric pressure and room temperature conditions.

According to the embodiment of the present invention, in the process of producing trifluoroamine oxide by decomposing $NF_2OSbF_6$ which is an intermediate product in the $SbF_5/NF_3/N_2O$ reaction system, since potassium fluoride instead of conventional sodium fluoride is reacted with $NF_2OSbF_6$, the reaction can be carried out spontaneously at atmospheric pressure and room temperature without a vacuum device or an additional heating process, thereby manufacturing costs can be reduced and productivity can be improved.

BRIEF DESCRIPTION OF THE DRAWINGS

The FIGURE is a flowchart illustrating the method for producing trifluoroamine oxide according to the embodiment of the present invention.

DETAILED DESCRIPTION

Hereinafter, preferred embodiments of the present invention will be described with reference to the drawings. However, the following embodiments and examples are merely illustrative of preferred configurations of the present invention, and the scope of the present invention is not limited to these configurations. In the following description, the hardware configuration and software configuration, process flow, manufacturing condition, size, material, shape, etc. of the apparatus are not intended to limit the scope of the present invention, particularly unless specifically stated.

The method for producing trifluoroamine oxide according to an embodiment of the present invention described below, when synthesizing trifluoroamine oxide by decomposing $NF_2OSbF_6$, which is an intermediate product, in the $SbF_5/NF_3/N_2O$ reaction system described in Patent Literature 2 or Patent Literature 3, employs potassium fluoride (KF) which enables a spontaneous reaction at atmospheric pressure and room temperature, rather than sodium fluoride requiring heating at about 150° C. to 200° C. under vacuum. Accordingly, since vacuum equipment is not required as a reactor and additional heating is not required for the reaction, manufacturing costs can be reduced. In addition, it is possible to improve productivity due to a fast reaction speed.

The FIGURE is a flowchart illustrating the method for producing trifluoroamine oxide according to the embodiment of the present invention.

Referring to the FIGURE, the method for producing trifluoroamine oxide according to the embodiment of the present invention includes the steps of: preparing an intermediate product by simultaneously providing and reacting nitrogen trifluoride and nitrous oxide under the presence of a reaction activator of $SbF_5$ (S10); and producing trifluoroamine oxide by reacting the intermediate product with potassium fluoride (S20). In this method, the reaction of the intermediate product with potassium fluoride can be performed under atmospheric pressure and room temperature conditions.

Hereinafter, the method for producing trifluoroamine oxide according to the present embodiment will be described in detail for each step.

First, the producing method of trifluoroamine oxide according to the embodiment of the present invention includes the step S10 of preparing the intermediate product by reacting nitrogen trifluoride and nitrous oxide under the presence of a reaction activator.

In the step of preparing the intermediate product, the reaction of either Reaction Formula 1 or Reaction Formula 2 is performed, or the reactions of Reaction Formulas 1 and 2 are simultaneously performed. In Reaction Formulas 1 and 2, the reaction activator is $SbF_5$. Examples of the reactions using the reaction activator are shown in the following Reaction Formulas 1 and 2.

$$NF_3+N_2O+SbF_5 \rightarrow NF_2OSbF_6+N_2 \qquad \text{<Reaction Formula 1>}$$

$$NF_3+N_2O+2SbF_5 \rightarrow NF_2OSb_2F_{11}+N_2 \qquad \text{<Reaction Formula 2>}$$

In the step S10 of preparing the intermediate product, the reaction time may be reduced by removing the generated nitrogen (N2) and the reactant gases mixed therewith and additionally providing a fresh feed of nitrogen trifluoride and nitrous oxide.

In the step S10 of preparing the intermediate product, as the reactions of Reaction Formula 1 and Reaction Formula 2 proceeds, the reaction rate becomes slow, and the reaction time becomes very long for 80 hours or more. To solve this problem, nitrogen (N2) and the reactant gases mixed therewith are removed and a fresh feed of nitrogen trifluoride and nitrous oxide are additionally provided during the reactions of the step S10 for preparing the intermediate product, thereby the reaction time may be reduced by 80% or more, more preferably 85% or more, compared to the prior art, to 8 to 10 hours.

In addition, in the step S10 of preparing the intermediate product, nitrogen trifluoride and nitrous oxide may be separated from the mixture of nitrogen and the reactant gases and may be reused. For example, nitrogen is removed from the mixture of the nitrogen and the reactant gases through a distillation process, and nitrogen trifluoride and nitrous oxide are separated and recycled to be reused in the reactions of the step S10 of preparing the intermediate product. The recycle may be made every time when the ratio of a remaining amount of $SbF_5$ relative to an initial amount, the conversion ratio, becomes about 40% to about 95%, preferably about 50% to about 90%, and more preferably about 60% to about 85%. The time to reach the conversion ratio described above in the reaction is only 2 to 3 hours, thus the reaction time to achieve the total conversion ratio of 100% can be reduced to less than 10 hours.

As described above, during the reactions of the step S10 of preparing the intermediate product, nitrogen and the reactant gases may be removed, and a fresh feed of nitrogen trifluoride and nitrous oxide or nitrogen trifluoride and nitrous oxide recovered from the mixture of nitrogen and the reactant gases may be additionally provided, thereby significantly reducing the reaction time. In addition, the size of the reactor for producing the same amount of trifluoroamine oxide, can be reduced to about ⅛ to 1/20, whereby productivity can be improved.

The reaction ratio of the reaction activator, nitrogen trifluoride, and nitrous oxide is preferably 2: 1-10:1-10 in the step S10 of preparing the intermediate product, more preferably 2: 1-5:1-5, even more preferably 2: 2-5:2-5, and most preferably 2: 3-5:3-5. The reaction ratio of the reaction activator, nitrogen trifluoride, and nitrous oxide is basically 2:1:1 in a mole number, and the molar ratio of nitrogen trifluoride and nitrous oxide may be 1 to 10, respectively. If the reaction ratio of the reaction activator, nitrogen trifluoride, and nitrous oxide is less than 2:1:1 (the molar ratio of nitrogen trifluoride and nitrous oxide is less than 1, respectively), the unreacted reaction activator such as $SbF_5$, which is highly hygroscopic and smokable, might remain and act as impurities in the reaction process of producing trifluoroamine oxide, and at the same time, it is very difficult to perform a pulverization process due to generation of heat and fume. If the reaction ratio is more than 2:10:10 (the molar ratio of nitrogen trifluoride and nitrous oxide is more than 10, respectively), the reaction pressure goes too high, resulting in the increase of reactor manufacturing costs and the risk of explosion during the reaction. So, the molar ratio is preferably 2:2:2 (reaction activator:nitrogen trifluoride: nitrous oxide), and more preferably 2:1.2:2. This is because when the intermediate product $NF_2O$-salt is prepared, the reaction activator and nitrogen trifluoride $(NF_3)$ form a primary salt by chlorination and then react with nitrous oxide $(N_2O)$. So, it is preferred to add a little excessive amount of nitrous oxide $(N_2O)$ which displays a relatively lower reactivity.

In the step S10 of preparing the intermediate product, the reaction is performed preferably in a temperature range of 110° C. to 150° C., more preferably in a temperature range of 120° C. to 150° C., and most preferably in a temperature range of 130° C. to 150° C. If the reaction temperature is lower than 110° C., which is close to the melting point of the intermediate product $NF_2O$-salt, the solid $NF_2O$-salt is precipitated, so that stirring becomes difficult and absorption of gaseous $NF_3$ and $N_2O$ becomes slow, which results in that the reaction does not go smoothly. If the reaction temperature is higher than 150° C., the decomposition reaction is partially induced so that the raw materials, $NF_3$ and $N_2O$, might be regenerated or the byproducts such as NO and $NO_2$ might be generated, resulting in the decrease of yield. If the reaction temperature is too high, high pressure is applied to the reactor, and vapor pressure of the raw materials. $NF_3$ and $N_2O$ also increases. Then, absorbency of the reaction activator existing in the liquid phase is reduced as well, and thereby the production cost of the reactor goes high, and the reaction rate is lowered.

The reactions of Reaction Formula 1 and Reaction Formula 2, which comprise the step S10 of preparing the intermediate product, are gas-liquid phase reactions. Accordingly, unlike in a gas-gas reaction, the intermediate activator $SbF_5$ which is in the liquid phase absorbs gaseous raw materials, $NF_3$ and $N_2O$, leading to neutralization reaction. Therefore, the reaction temperature is preferably maintained at a temperature lower than the boiling point of $SbF_5$, 149.5° C., and it is important to maintain a minimum temperature at which stirring can be smoothly performed.

Further, in the step S10 of preparing the intermediate product, the reactions are performed in a suitable high-pressure reactor, preferably in a reactor comprising an anchor type stirring device in the size of half the inner diameter of the reactor. The absorption of $NF_3$ and $N_2O$ is promoted through the reactor and the stirring is maintained preferably at a rotation speed of 50 rpm to 800 rpm for progressing smooth reaction, more preferably at a rotation speed of 100 rpm to 500 rpm, and most preferably at a rotation speed of 200 rpm to 400 rpm. If the rotation speed is less than 50 rpm, the absorption of the gaseous raw materials, $NF_3$ and $N_2O$, becomes too slow in the course of the gas-liquid phase reaction, and thereby the reaction progress goes slow, suggesting that the reactor size needs to be increased and the productivity is decreased. If the rotation speed exceeds 800 rpm, mechanical abrasion due to high-speed stirring may occur, resulting in the increase of maintenance costs.

The type of the stirrer can be exemplified by a grand seal, a mechanical seal and a magnetic drive. However, considering the reactions at a high temperature and a high pressure, a magnetic drive is more preferred. The material of the reactor used in the reaction can be stainless steel, hastelloy or alloy. When stainless steel is used for the reactor, it is preferred to perform passivation using fluorine $(F_2)$ gas before use.

In the step S10 of preparing the intermediate product, nitrogen trifluoride and nitrous oxide can be fed preferably simultaneously under the presence of a reaction activator, or nitrogen trifluoride may be fed to the reactor first and then nitrous oxide may be subsequently fed thereto. On the other hand, if nitrous oxide is fed first under the presence of the reaction activator and then nitrogen trifluoride is subsequently fed, the reaction takes too long, and the yield becomes very low.

In the step S10 of preparing the intermediate product, the progress of the reaction can be calculated by tracing the consumed gaseous raw materials of nitrogen trifluoride $(NF_3)$ and nitrous oxide $(N_2O)$, and the resulting gaseous nitrogen $(N_2)$ by gas chromatography. In general, calibration is performed with a standard gas before calculation.

Particularly, the reactions of the step of preparing the intermediate product may include a process of tracking and analyzing the proportion of nitrogen trifluoride and nitrous oxide consumed and the ratio of nitrogen generated by using at least one system selected from the group consisting of gas chromatography TCD, 5% fluorocol/carbopack B column and molecular sieve capillary column, during the reactions.

The producing method of trifluoroamine oxide according to an aspect of the present invention comprises a step S20 of producing trifluoroamine oxide by reacting the intermediate product with potassium fluoride. The reaction between the intermediate product and potassium fluoride may be performed spontaneously under atmospheric pressure and room temperature conditions.

In the step S20 of producing trifluoroamine oxide $(F_3NO)$, Reaction Formula 3 or Reaction Formula 4 may be performed, or Reaction Formula 3 and Reaction Formula 4 may be performed together.

$$NF_2OSbF_6 + KF \rightarrow F_3NO + KSbF_6 \qquad \text{<Reaction Formula 3>}$$

$$NF_2OSb_2F_{11} + KF \rightarrow F_3NO + 2KSbF_6 \qquad \text{<Reaction Formula 4>}$$

In the step S20 of producing trifluoroamine oxide, the reaction ratio of the intermediate product and potassium fluoride is preferably 1: 1-4. The reaction of the step of producing trifluoroamine oxide is a solid-solid reaction. Thus, solid-solid surface contact is very important. In the reaction proposed in the present invention, the reaction molar ratio of $NF_2O$-salt and potassium fluoride (KF), which are reactants, is preferably 1.0 to 4.0. When the fed amount of potassium fluoride is less than 1.0 mol, it is difficult to complete the reaction, and when the amount of potassium fluoride exceeds 4.0 mol, the amount of fed solid increases, and thus problems may occur in stirring. Uniform mixing of the $NF_2O$-salt and KF is important to activate the reaction in the solid-solid reaction. When sufficient contact is not made due to a problem in stirring, an extremely low yield of trifluoroamine oxide ($F_3NO$) may be obtained. In order to increase contacts between the reactants, the $NF_2O$-salt and the KF should be sufficiently pulverized and mixed to initiate a reaction, whereby resulting in an increase of yield, and more preferably, the reactants may be mixed and formed in pellets, whereby a smooth reaction may be carried out.

In addition, in the step S20 of producing the trifluoroamine oxide, the reaction can be spontaneously performed at atmospheric pressure and room temperature. Therefore, in order for the reaction to be performed, it is not necessary to make the inside of the reactor vacuum or reduced pressure conditions or to further heat the reactor.

Further, in the step S20 of producing trifluoroamine oxide, the degree to which the reaction is progressed may be calculated by tracking gaseous materials by gas chromatography. Typically, calibration is performed with a standard gas prior to tracking.

Specifically, in the step S20 of producing trifluoroamine oxide, the method may further include a process of tracking and analyzing a ratio of $F_3NO$, which is a product, and by-products ($NF_3$, $N_2O$ and NO) using at least one of gas chromatography TCD, 5% fluorocol/carbopack B column and molecular sieve capillary column during the reactions.

Although not shown in the FIGURE, $KSbF_6$ obtained as a by-product in the step S20 of producing trifluoroamine oxide may be heated and decomposed to recover $SbF_5$, which may be reused as the reaction activator in the step S10 of preparing the intermediate product. Accordingly, it is possible to further reduce manufacturing costs by reducing the amount of $SbF_5$ used.

As described above, the above description is merely exemplary and should not be construed as limiting. The technical idea of the present invention should be defined only by the invention as set forth in the following claims, and all technical ideas within the scope equivalent thereto should be construed as being included in the scope of the present invention. Therefore, it will be obvious to a person skilled in the art that the above-described embodiments may be implemented by being modified in various forms.

The invention claimed is:

1. A method for producing trifluoroamine oxide comprising steps of:

preparing an intermediate product by simultaneously feeding and reacting nitrogen trifluoride and nitrous oxide under the presence of a reaction activator of $SbF_5$; and producing trifluoroamine oxide by reacting the intermediate product with potassium fluoride, wherein the step of reacting the intermediate product with potassium fluoride is performed under atmospheric pressure and room temperature conditions.

\* \* \* \* \*